United States Patent [19]

Mikolaicyk et al.

[11] Patent Number: 4,639,076
[45] Date of Patent: Jan. 27, 1987

[54] LENS HOLDER ASSEMBLY FOR A FIBER OPTIC CONNECTOR

[75] Inventors: John H. Mikolaicyk, Oneonta; Leonard A. Krantz, Jr., Sidney, both of N.Y.

[73] Assignee: Allied Corporation, Morris Township, Morris County, N.J.

[21] Appl. No.: 550,848

[22] Filed: Nov. 14, 1983

[51] Int. Cl.⁴ .................................................. G02B 6/36
[52] U.S. Cl. ................................ 350/96.20; 350/96.18
[58] Field of Search ............... 350/96.18, 96.20, 96.21, 350/96.22

[56] References Cited

U.S. PATENT DOCUMENTS

| | | | |
|---|---|---|---|
| 3,649,098 | 3/1972 | Suverison | 350/96.18 |
| 3,990,779 | 11/1976 | McCartney | 350/96.21 |
| 4,060,309 | 11/1977 | LeNoane et al. | 350/96.18 |
| 4,186,995 | 2/1980 | Schumacher | 350/96.20 |
| 4,190,316 | 2/1980 | Malsby et al. | 350/96.18 |
| 4,204,743 | 5/1980 | Etaix | 350/96.20 |
| 4,252,406 | 2/1981 | Ryan, Jr. et al. | 350/96.21 |
| 4,255,016 | 3/1981 | Borsuk | 350/96.21 |
| 4,265,511 | 5/1981 | Nicia et al. | 350/96.18 |
| 4,268,115 | 5/1981 | Slemon et al. | 350/96.21 |
| 4,269,648 | 5/1981 | Dakss et al. | 350/96.18 X |
| 4,290,667 | 9/1981 | Chown | 350/96.18 |
| 4,353,619 | 10/1982 | Parr | 350/96.21 |
| 4,421,383 | 12/1983 | Carlsen | 350/96.21 |
| 4,534,616 | 8/1985 | Bowen et al. | 350/96.20 |

FOREIGN PATENT DOCUMENTS

| | | | |
|---|---|---|---|
| 2334969 | 7/1977 | France | 350/96.18 |
| 2097149 | 10/1982 | United Kingdom | 350/96.18 |

Primary Examiner—John Lee
Attorney, Agent, or Firm—Anibal Jose Cortina

[57] ABSTRACT

This invention is a lens type fiber optic connector that has a lens holder assembly (70) releasably mounted (54, 78) within the bore of an insert (55). This arrangement provides for quick and easy installation, repair or replacement of a lens (10) or defective optical fiber (81) without the need to replace or disassemble the entire connector.

10 Claims, 3 Drawing Figures

LENS HOLDER ASSEMBLY FOR A FIBER OPTIC CONNECTOR

This invention relates to a lens type fiber optic connector having an insertable and removable lens assembly.

A fiber optic connector is used to align and optically couple together one or more pairs of optical fibers that transmit signals in the form of light. If the fibers are not precisely aligned or optically coupled an undesirable loss of the light signal occurs. One type of fiber optic connector that is used to obtain maximum optical coupling of fibers includes a pair of lenses located between facing optical fibers to collimate the light from one fiber to another. Examples of such a connector may be found in U.S. Pat. Nos. 4,265,511 issued May 5, 1981 and entitled "Detachable Connector For Optical Fibers," and 4,190,316 issued Feb. 26, 1980 and entitled "Lens Connector For Optical Fibers." In such connectors the axial alignment of the focal point of a lens transmitting light to another lens or optical fiber is essential to transfer light without losses. Further, this optical alignment must be maintained even though a connector may be repeatedly coupled and uncoupled for installation, repair, rearrangement or removal of an optical fiber or a lens.

The foregoing patents disclose lens type fiber optic connectors that have lenses that are time consuming and difficult to install, repair or replace. Accordingly, there is a demand for a lens type fiber optic connector wherein the lens may be easily installed, rearranged or replaced and the axial alignment of the lens easily accomplished.

SUMMARY OF THE INVENTION

This invention provides a fiber optic connector with an insertable and removable lens assembly and a simple arrangement for aligning the focal points of the lenses. The invention is characterized by a lens assembly that may be easily snapped into and out of a fiber optic connector.

Accordingly, one advantage of this invention is that it provides easy insertion and removal of a lens from a fiber optic connector for installation, repair, or replacement of the lens or optical fiber without the need to replace or disassemble the entire connector.

DETAILED DISCUSSION OF THE INVENTION

Figure 1:
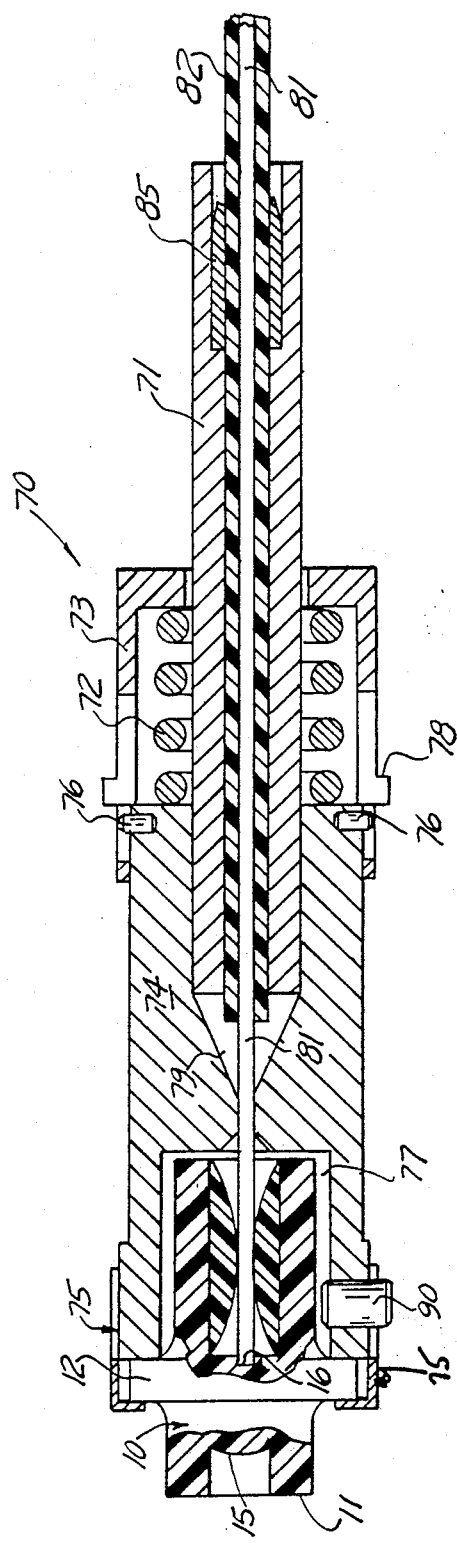
FIG. 1 illustrates a lens holder assembly incorporating the principles of this invention.

FIG. 1 illustrates a lens assembly 70 incorporating the principles of this invention. The lens assembly 70 includes a tubular member 74 having a central passage that terminates at one end in an enlarged opening 77; a conduit 71 extending from the other end of the tubular member 74; a lens 10 mounted to the forward end of the tubular member 74; and a spring 72 operated biasing mechanism at the other end of the tubular member 74. The lens 10 includes a forwardly facing curved surface 15 and a recess 16 in the surface opposite the curved surface 15. The recess 16 is the focal point of the lens 10 which has been formed into the lens as a result of the design of a mold. The recess 16 is axially aligned with the curved surface 15 and the central passage of the tubular member 74 and is adapted to receive one end of an optical fiber 81 that is inserted into the conduit 71 and central passage of the tubular member 74. The tapered portion 79 of the central passage aids in guiding the fiber 81 into the recess 16 of the lens 10. The lens also includes a radially extending annular shoulder 12 which is captivated by a plurality of spring fingers 75 mounted to the forward end portion of tubular member 74. The lens 10 may be removed from the lens holder assembly 70 and replaced by deflecting radially outwardly the spring fingers 75. The pin 90 of the assembly 70 is located in a groove in the connector insert (55, FIG. 3) to prevent rotation of the lens and changes in the optical coupling between lenses. The spring 72 is mounted to the tubular member 74 by a housing 73 which is connected to the tubular member 74 by pin 76 located in an axial slot in the housing 73. To assist inserting an optical fiber 81 having a protective sheath 82, into the central passage of tubular member 74, a conduit 71 is mounted to the rear end portion of the central passage of the tubular member 74. The rear end portion of the conduit 71 includes a plurality of inwardly biased metallic fingers 85 that engage and apply a compressive force to the protective sheath 82 of the optical fiber 81 and prevent unwanted movement.

Figure 2:
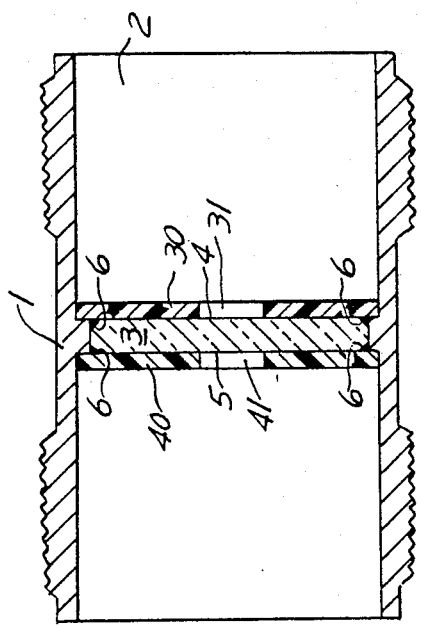
FIG. 2 illustrates the internal hermetic seal within the main housing of a fiber optic connector assembly.

FIG. 2 illustrates the internal hermetically sealed portion of the fiber optic connector which includes: a main housing 1 having a central passage 2; an optically transparent window 3; and a hermetic seal 6 between the periphery of the window 3 and the wall of the passage 2 in the housing 1. The hermetic seal 6 may be made by first vapor depositing or sputtering a metal coating to the end portion of the window and then soldering together the metal portion of the window and the connector shell with a 60/40 tin/lead solder composition. Another method that may be used to provide a hermetic seal between the window 3 and the wall of the central passage 2 would be a weld between a thick metal deposit on the window and the wall of the passage 2. For a window comprised of a plastic material, the hermetic seal may be accomplished by using an epoxy cement between the window and central passage 2 of the housing 1. The window 3 may also be molded or fused into the central passage 2.

Located on each side of the window 3 are inserts or members 30 and 40 each having a bore 31 and 41 axially aligned with the other bore. The bores 31 and 41 of the members 30 and 40 are used to receive and align a pair of lenses (10 and 20, FIG. 3). The members 30 and 40 are generally made of a semi-rigid material such as plastic or nylon, although metal may also be used. The members 30 and 40 are attached to the surface of the window 3 by a cement, e.g., silicone rubber. One advantage of cementing the members 30 and 40 to the window 3 is that it helps prevent distortion of the members 30 and 40 due to any forces asserted against them by other components of a complete connector assembly.

Figure 3:
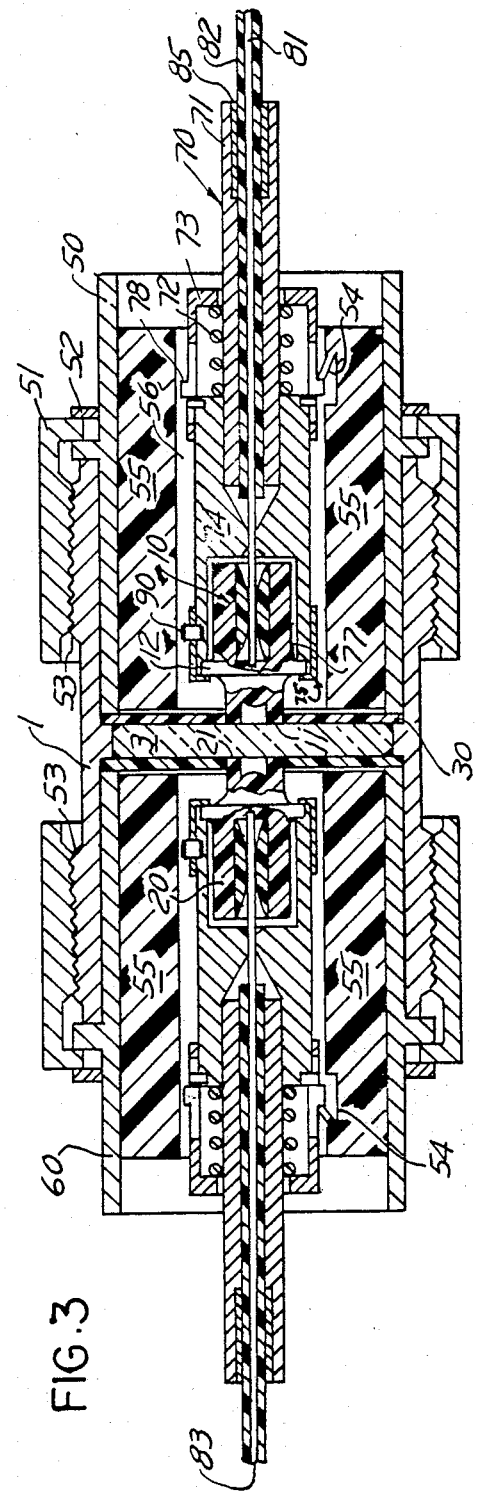
FIG. 3 illustrates a hermetically sealed separable fiber optic connector assembly incorporating the principles of this invention.

FIG. 3 illustrates a hermetically sealed separable fiber optic connector assembly incorporating the principles of this invention. The connector assembly includes: a main housing 1; a second housing 50 and a third housing 60. The second housing 50 is connected to the main housing 1 by a threaded 53 coupling nut 51 and is retained on the second housing 50 by a snap ring 52. A first insert 55 and a lens 10 holder assembly 70 and a second insert 55 are mounted within the second housing 50. The lens holder assembly 70 includes: a tubular member 74 having a central passage; a conduit 71 extending out of one end of the central passage, the other end of the central passage having an enlarged portion 77 receiving one end portion of the lens 10; a spring 72 mounted within a spring retainer housing 73 that is connected to the tubular member 74 by a pin 76; and a plurality of angled spring fingers 75 at one end of the body 74 for captivating an enlarged portion 12 of the lens 10 so that the lens 10 is secured to the tubular member 74. The function of the conduit 71 is to hold and guide an optical fiber 81 through the central passage of the tubular member 74 so that is may be optically coupled to the lens 10. The optical fiber 81 includes an outer protective sheath 82.

The insert 55 in the second housing 50 includes a plurality of radially inwardly extending and resiliently deflectable spring fingers 54 which engage a shoulder 78 on the lens holder assembly 70 and retain the lens holder assembly 70 within the insert 55 of the second housing 50. By inserting a tubular tool (not shown) into the bore of insert 55 and around the outside of the spring retainer housing 73, the retaining fingers 54 may be deflected outwardly to allow removal of the lens holder assembly 70 from the insert 55 of the second housing 50. The lens holder assembly 70 is mounted in the insert 55 so that the forward facing surface 11 of the lens 10 is in contact with the window 3 of the main housing 1 with the spring 72 acting to bias the surface 11 of the lens 10 against the window 3. The forwardly facing flat surfaces 11 and 21 of the lenses 10 and 20 are perpendicular to their axes and when the lenses are placed through the bores 31 and 41 and against the window 3 axial alignment between lenses 10 and 20 is assured.

On the opposite side of the window 3, of the main housing 1, is a third housing 60 which contains a second lens 20 and another optical fiber 83. The arrangement within the third housing 60 is identical to the arrangement within the second housing 50.

While a preferred embodiment of the invention has been disclosed, it will be apparent to those skilled in the art that changes may be made to the invention as set forth in the appended claims and, in some instances, certain features of the invention may be used to advantage without corresponding use of other features. For instance, the lens assembly 70 need not be used with a hermetically sealed fiber optic connector. In the absence of the window 3 to prevent forward movement of the lens assembly 70 the insert 55 would include an annular shoulder to engage the forward end of the lens assembly. Also the shape of the housings 50, 60 may be other than cylindrical and, in such instance, the coupling nut 51 and threads 53 would be replaced by some form of latch. Further, the location of the shoulder 78 and spring fingers 54 retaining the lens holder assembly 70 may be reversed without changing their function. This would be accomplished by having the fingers as part of the lens holder assembly 70 and the shoulder as part of the insert 55. Accordingly, it is intended that the illustrative and descriptive materials herein be used to illustrate the principles of this invention and not to limit the scope of the invention.

Having described the invention what is claimed is:

1. A lens holder assembly comprising a connector for terminating an optical fiber, said assembly comprising a housing having a forward end, a rear end, and a central passage extending between the ends for receiving an optical fiber;

a lens removably mounted on the forward end of said housing, and said lens having a forwardly facing curved surface, and a surface opposite said curved surface, said opposite surface optically aligned with the curved surface and adapted to be optically aligned with one end of said optical fiber, and wherein said opposite surface has a portion wherein is received in an optically aligned manner, with respect to said lens, said one end of said optical fiber, said portion being located at the focal point of said lens and axially aligned with said curved surface and said central passage;

means for releasably mounting said lens to said housing so that said opposite lens surface is axially aligned with the central passage in said housing;

a spring; and means for mounting said spring to said housing for axial compression upon application of opposing axial forces to said lens holder assembly.

2. The lens holder assembly as recited in claim 1 wherein said lens includes a recess in said opposite surface that is at the focal point of the lens and axially aligned with the central passage in the housing, and said recess being said portion wherein is received in an optically aligned manner with respect to said lens, said one end of said optical fiber.

3. The lens holder assembly as recited in claim 2 wherein said lens includes a radially extending annular shoulder and wherein said lens mounting means includes a plurality of radially deflectable spring fingers mounted at one end to the forward end portion of said housing, said fingers having at the other free end thereof a rearwardly facing portion that engages the forwardly facing portion of the annular shoulder of the lens to releasably mount the lens to the forward end portion of the housing.

4. The lens holder as recited in claim 3 including means applying a compressive force to a portion of an optical fiber located in the central passage of said housing.

5. In combination with a fiber optic connector of the type having: a housing having a central passage; an insert mounted in the central passage of said housing, said inset having at least one bore therein; at least one lens; and means for mounting a lens in each bore, the improvement wherein the lens and lens mounting means comprises:

a lens holder assembly for terminating an optical fiber, and a respective one of said lens holder assembly located in each of said bores, said lens holder assembly comprising:

a tubular member having a forward end, a rear end, and a central passage extending between the ends for receiving an optical fiber;

a lens removably mounted on the forward end of said housing; and said lens having a forwardly facing curved surface and a recess in the surface opposite said curved surface, said recess axially aligned with the curved surface for receiving an end of an optical fiber therein and located at the focal point of said lens for terminating said optical fiber;

means for mounting said lens to said tubular member so that said curved surface is facing forwardly and said recess is facing rearwardly and is axially aligned with the central passage in said tubular member and adapted to receive said one end of said optical fiber; and means for releasably retaining a lens holder assembly in each bore of said insert, said means including a plurality of resiliently and radially deflectable spring fingers extending axially in each bore and located on one of said insert and lens holder assembly and a surface located on the other of said insert and lens holder assembly that engages the ends of each of said fingers to selectively prevent axial movement of said lens holder assembly in one axial direction.

6. The fiber optic connector as recited in claim 5 including means for forwardly biasing said lens holder assembly.

7. The fiber optic connector as recited in claim 6 wherein said biasing means includes:

a spring; and means for mounting said spring to said tubular member for axial compression upon application of opposing axial forces to said lens holder assembly, said means for mounting said spring including an annular shoulder extending radially outwardly beyond the outer surface of said tubular member, the rearward facing portion of said annular shoulder engaging spring fingers extending inwardly from the insert into the bore.

8. A fiber optic connector as recited in claim 7 wherein said lens has a front end, and said connector further comprises means for receiving the front end of said lens for axially positioning said lens in said insert.

9. A fiber optic connector as recited in claim 6 wherein said lens has a front end, and said connector further comprises means for receiving the front end of said lens for axially positioning said lens in said insert.

10. A fiber optic connector as recited in claim 5 wherein said lens has a front end, and said connector further comprises means for receiving the front end of said lens for axially positioning said lens in said insert.

* * * * *